United States Patent [19]

Smith, deceased

[11] Patent Number: 5,012,058

[45] Date of Patent: Apr. 30, 1991

[54] MAGNETRON WITH FULL WAVE BRIDGE INVERTER

[75] Inventor: Peter H. Smith, deceased, late of Anchorage, Ky., by Pamela S. Smith, executor

[73] Assignee: General Electric Company, Louisville, Ky.

[21] Appl. No.: 390,491

[22] Filed: Aug. 1, 1989

Related U.S. Application Data

[63] Continuation of Ser. No. 138,138, Dec. 28, 1987, abandoned.

[51] Int. Cl.⁵ .............................................. H05B 6/64
[52] U.S. Cl. ............................... 219/10.55 B; 363/17; 363/98
[58] Field of Search .......................... 363/17, 98, 132; 219/10.55 B

[56] References Cited

U.S. PATENT DOCUMENTS

| | | | |
|---|---|---|---|
| 3,396,342 | 8/1968 | Feinberg | 328/262 |
| 3,495,129 | 2/1970 | Donner et al. | 317/14 |
| 3,564,384 | 1/1969 | Adler | 363/17 |
| 3,735,237 | 5/1973 | Derby | 363/8 |
| 3,969,652 | 7/1976 | Herzog | 315/224 |
| 3,973,165 | 8/1976 | Hester | 315/105 |
| 4,071,812 | 1/1978 | Walker | 363/80 |
| 4,105,957 | 8/1978 | Cathell | 331/110 |
| 4,204,266 | 5/1980 | Kammiller et al. | 363/132 |
| 4,281,372 | 7/1981 | Kornrumpf | 363/20 |
| 4,318,165 | 3/1982 | Kornrumpf et al. | 363/21 |
| 4,404,623 | 9/1983 | Jourdan | 363/56 |
| 4,408,267 | 10/1983 | Pruitt | 363/17 |
| 4,475,149 | 10/1984 | Gallios | 363/17 |
| 4,593,167 | 6/1986 | Nilssen | 219/10.55 B |
| 4,672,159 | 6/1987 | Nilssen | 219/10.55 B |
| 4,680,506 | 7/1987 | Nilssen | 315/102 |
| 4,710,686 | 12/1987 | Guzik | 363/98 |

FOREIGN PATENT DOCUMENTS

| | | |
|---|---|---|
| 52-79345 | 7/1977 | Japan . |
| 52-101742 | 8/1977 | Japan . |
| 53-110141 | 9/1978 | Japan . |
| 58-59588 | 4/1983 | Japan . |
| 1394736 | 5/1975 | United Kingdom . |
| 1481548 | 8/1977 | United Kingdom . |
| 1524722 | 9/1978 | United Kingdom . |
| 2134339A | 8/1984 | United Kingdom . |
| 2163013A | 2/1986 | United Kingdom . |

Primary Examiner—Steven L. Stephan
Assistant Examiner—Jeffrey Sterrett
Attorney, Agent, or Firm—H. Neil Houser; Radford M. Reams

[57] ABSTRACT

An arrangement for providing power to a cooking magnetron uses a full wave bridge inverter circuit. Four semiconductor switches, pairs of which are switched on and off by a pulse width modulation control circuit provide power to a primary winding of a power transformer. A secondary winding of the power transformer supplies the power to the magnetron. The control circuit switches two of the four transistors on and off by way of an isolated drive circuit such that the control terminals of the semiconductor switches float with respect to the other two semiconductor switches. The control circuit includes pulse width modulation circuitry which provides a control pulse having a width proportional to an input provided across a transconductance amplifier. A signal dependent upon magnetron current is used as part of a feedback loop such that a magnetron current is stabilized against variations due to line voltage changes.

3 Claims, 7 Drawing Sheets

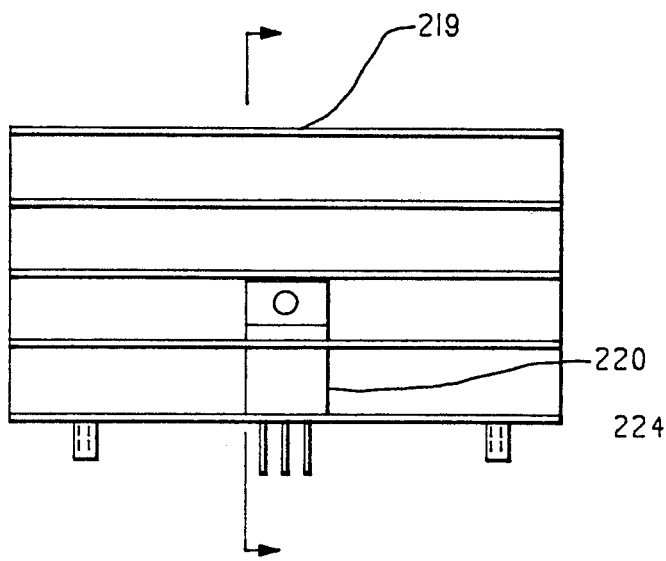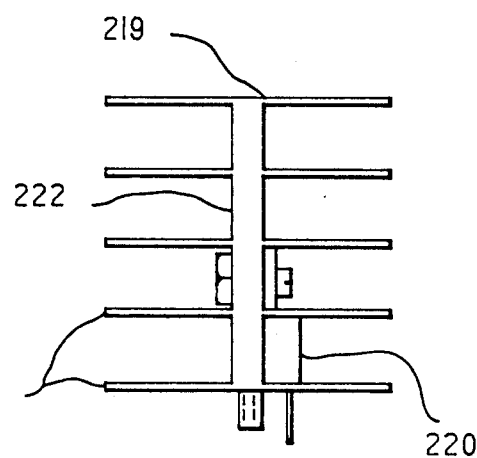
FIG. 8  FIG. 9
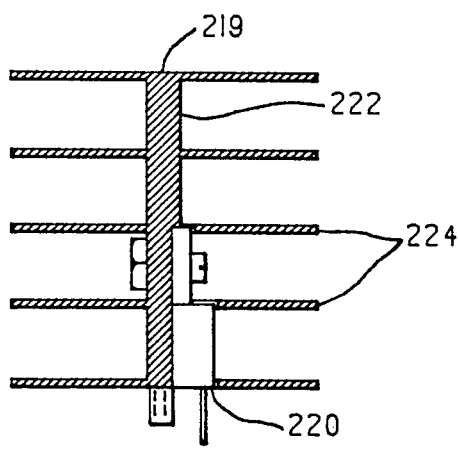
FIG. 10

MAGNETRON WITH FULL WAVE BRIDGE INVERTER

This application is a continuation of application Ser. No. 138,138, filed Dec. 28, 1987.

CROSS-REFERENCE TO RELATED APPLICATIONS

This application discloses and claims subject matter related to subject matter disclosed and claimed in the following related applications, which applications are filed concurrently herewith and are hereby incorporated by reference:

"FILAMENT POWER COMPENSATION FOR MAGNETRON", Ser. No. 138,136;

"MAGNETRON WITH TEMPERATURE PROBE ISOLATION", Ser. No. 138,714;

"MAGNETRON WITH FREQUENCY CONTROL FOR POWER REGULATION", Ser. No. 138,135;

"MAGNETRON WITH MICROPROCESSOR POWER CONTROL", Ser. No. 138,137; and

"MAGNETRON WITH MICROPROCESSOR BASED FEEDBACK CONTROL", Ser. No. 138,139.

These applications, which were filed in the name of Peter Smith, except that "MAGNETRON WITH FREQUENCY CONTROL FOR POWER REGULATION" names Peter Smith and Flavian Reising, Jr. as co-inventors, and "FILAMENT POWER COMPENSATION FOR COOKING MAGNETRON" names Peter Smith, Flavian Reising, Jr., and Thomas R. Payne as co-inventors, are assigned to the Assignee of the present application.

BACKGROUND OF THE INVENTION

This invention relates generally to a cooking magnetron power supply system and, more particularly, to such a system using a full wave bridge inverter.

Most microwave ovens presently on the market use a 50 or 60 Hz LC power supply system along the lines described in U.S. Pat. No. 3,396,342 Feinberg issued on Aug. 6, 1968. This type of power supply, which is used in microwave cooking appliances from low power subcompacts to combination electric range/microwave units, has existed for over twenty years.

Among the advantages of the Feinberg power supply system are the simplicity of using only four components and good control of the power factor. Disadvantages include the bulk (weight and size) need for controlling the power by the duty cycle only, non-continuous filament power at power levels other than 100%, high in-rush current and lamination noise. The bulk disadvantage of the Feinberg system results from the requirement for a 50 or 60 Hz transformer rating of about 1.2 KVA. Iron and copper weight of such a transformer typically weighs about 700 grams and occupies a volume of 1710 cubic centimeters. Additionally, a physically large capacitor is required as a necessary component when using such a transformer in order to provide constant current regulation of magnetron power against variations in line voltage.

A push-pull system has been used or proposed in connection with powering a cooking magnetron. Although the push-pull system avoids some of the disadvantages of the Feinberg power supply arrangement, such a push-pull system has included disadvantages such as high cost, complex logic, high voltage Darlington connected power transistors, reactive (i.e., power dissipative) snubber networks, inherent unbalance in volt second characteristics for each half cycle of operation being caused by uncontrolled turned-off characteristics of switching transistors, poor input power factor (for example, 0.6), high EMI generation, poor conversion, and higher cost magnetics. The higher cost magnetics corresponds to a design having a variable leakage transformer as a means of power control.

Another prior design is disclosed in U.S. Pat. No. 4,281,372 Kornrumpf issued on July 28, 1981. Although generally useful, that design included several disadvantages. In particular, the design was more complex and expensive than the Feinberg system. A peak current of over 4 amperes is required to permit the delivery of 700 watts of microwave power. This peak current tends to result in initial undesirable magnetron moding and eventual short term failure. Additionally, this design may cause undesirably high electromagnetic interference. This design also disadvantageously needed switching transistors which are required to handle large peak currents and hold off very high voltages. A further disadvantage of this design is that complex logic is required for controlling switch operation.

Accordingly, it is a principle object of the present invention to provide a microwave energy generating system having a power supply with low cost and low physical volume and weight.

A further object of the present invention is to provide a microwave energy signal system having a power circuit which has high efficiency, minimum EMI emissions and otherwise avoids or minimizes the problems of the power circuits discussed above.

SUMMARY OF THE INVENTION

The present invention provides an arrangement for powering a cooking magnetron by use of a full wave bridge inverter. The inverter uses four switches to alternate current flow in a power transformer primary winding. A secondary winding of the power transformer connects the supply power to the magnetron. In one form of the invention, the switches are semiconductor switches, more particularly MOSFET devices, and a diode is arranged in parallel to each of the semiconductor switches. A bridge rectifier is used to supply power to the inverter circuit. The power supplied to the inverter circuit by the bridge rectifier is DC having a minimum voltage during operation and a ripple caused by the AC at the input to the rectifier, the ripple being at least as great in magnitude as the minimum voltage. The inverter circuit includes a control circuit for controlling the operation of the switches. In one form of the invention, the control circuit generates gate pulses to switch the semiconductor switches at frequencies on the order of 20–30 KHz such that the frequency of current in the primary winding is similarly on the order of 20–30 KHz. A form of the invention uses a control circuit including a pulse width modulator. The primary winding is preferably the only primary winding of the transformer.

In a more specific aspect of the present invention, control terminals of two of the switches float with respect to the other two switches and an isolated drive circuit is used to apply signals to the floating control terminals. In one form of the invention, the isolated drive circuit includes an isolation transformer having a primary winding connected to the control circuit and having two secondary windings, each secondary winding connected to one of the floating control terminals. In another form of the invention, the isolated drive circuit includes two capacitors, each capacitor corresponding to one of the switches having a floating control terminal. Each capacitor is operable to use its charge to close the corresponding switch.

In another specific aspect of the present invention, the control circuit receives a control input signal representative of current in the magnetron and the control circuit is operable to switch pairs of the switches to an open state depending on the value of the control input signal. A power adjuster in the control circuit is operable to change the power of the magnetron by changing the length of intervals during which the switches are closed. More specifically, the power adjuster may be a power adjustment variable resistor and the control input signal is also dependent upon the setting of the power adjustment variable resistor.

BRIEF DESCRIPTION OF THE DRAWINGS

The above and other objects and features of the present invention will become more apparent when the following detailed description is considered in conjunction with the accompanying drawings wherein like characters represent like parts throughout the several views and in which:

FIGS. 8, 9, and 10 an respectively show front, side, and cross-section views of a heat sink.

DETAILED DESCRIPTION

Overview

Figure 1:
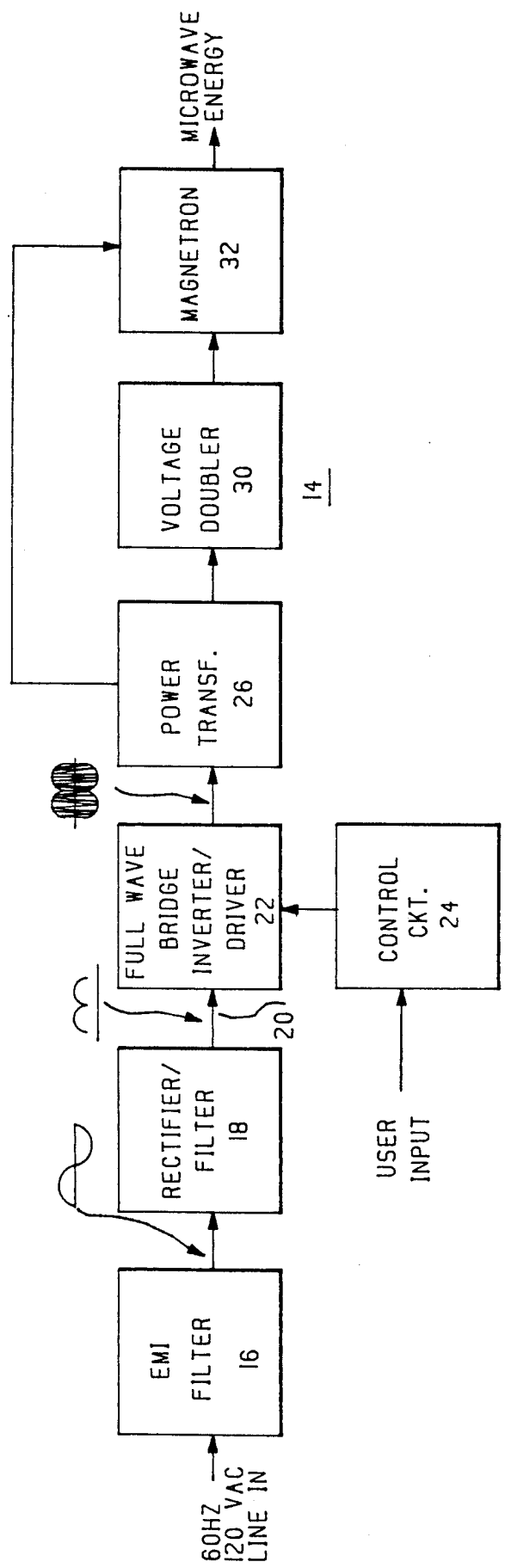
FIG. 1 shows a functional block diagram of the present system.

In the block diagram of FIG. 1, the microwave energy generating system 14 of the present invention includes an electromagnetic interference (EMI) filter 16 connected to a standard AC line. The filter 16 prevents the system 14 from transmitting troublesome signals to the AC line. The EMI filter 16 is connected to a rectifier/filter 18. As shown, the output of the rectifier/filter 18 on line 20 is a bulk DC signal, meaning that it has a substantial ripple resulting from the 60 Hz coming into the system 14. As will be discussed in detail below, the system uses the bulk DC on line 20 because that allows the use of a smaller filtering capacitor (in the rectifier/filter 18) then would otherwise be required. The smaller capacitor draws substantially less current from the AC line then would otherwise be required.

It should of course be noted that the block diagram of system 14 is somewhat simplified in that it leaves out safety switches, consumer control boards, input fuse, and similar components which are well known in connection with a microwave energy generating system.

The bulk DC on line 20 is supplied to a full wave bridge inverter/driver 22. The inverter/driver 22, which is under the control of control circuit 24, supplies high voltage AC at a frequency of about 25 KHz to a power transformer 26. The control may receive user input with respect to power setting, time of operation and other conditions commonly set by users when operating a microwave oven. As shown, the control circuit 24 is connected to the power transformer 26. As will be discussed in more detail below, the control circuit 24 receives a feedback signal from the power transformer 26.

The power transformer 26 supplies energy to a voltage doubler 30 which in turn powers the magnetron 32. The magnetron 32 also receives current for its filament from the power transformer 26.

Inverter and Associated Circuitry

Figure 2:
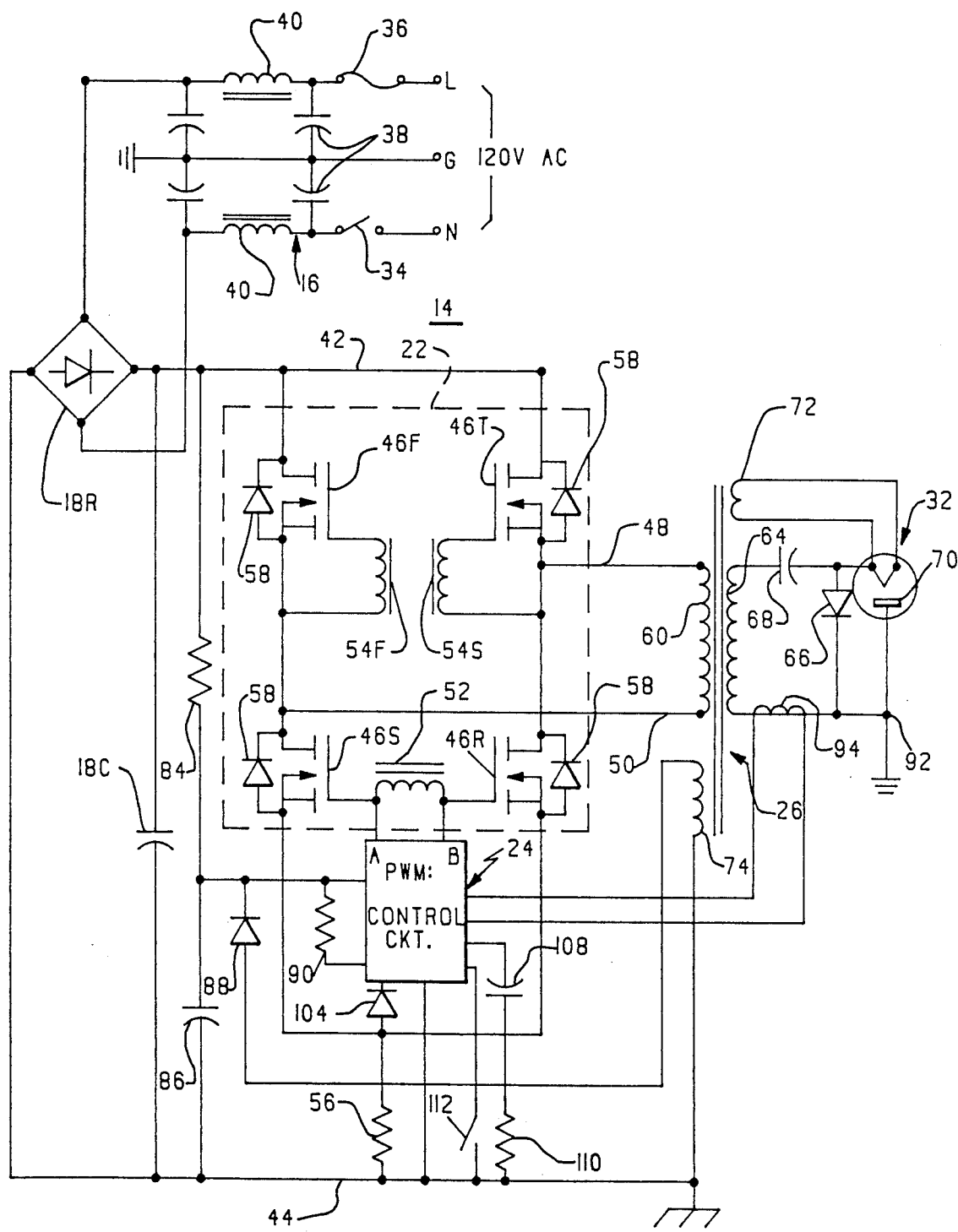
FIG. 2 shows a simplified schematic of the present system.

As shown in FIG. 2, the EMI filter 16 of the microwave generating system 14 receives 120 volts by way of power relay contacts 34 and fuse 36. The EMI filter 16 is a double pi filter comprising capacitors 38 and inductors 40. The signal from the filter 16 is supplied to the bridge rectifier 18R which supplies a rectified signal to lines 42 and 44. The signal is filtered by a filter capacitor 18C such that the signal across lines 42 and 44 is a bulk DC signal. Using a filter capacitor of 30 microfarads, 250 volt DC, the signal across lines 42 and 44 would vary in amplitude between 30 and 165 volts. Thus, the ripple or variation in amplitude resulting from the input AC signal is at least as great as the normal minimum voltage during operation of 30 volts. By operating the system 14 from bulk DC, one avoids the need for a high capacitance value capacitor for filter capacitor 18C. Use of a sufficiently high value capacitor as a filter would improve the smoothness of the DC signal across lines 42 and 44, but it would draw a very high current initially such that the fuse 36 and/or a circuit breaker in the user's household circuitry might be triggered.

The inverter/driver 22 includes first, second, third, and fourth transistors 46F, 46S, 46T, and 46R. The transistors serve as semiconductor switches for switching the bulk DC across inverter input lines 42 and 44 to the inverter output lines 48 and 50. The switches 46F, 46S, 46T, and 46R are switched on and off by control circuit 24. In the illustrative embodiment, the switches are 270 volt, 18A power FETs which are commercially available from International Rectifier under the designation IRF 640 power FETs.

The control circuit 24 is directly connected to the control terminals of semiconductor switches 46S and 46R. (For the MOSFETs shown, the control terminal will of course be the gate.) Additionally, the control circuit 24 controls the MOSFET switches 46F and 46T by way of an isolation transformer having a primary winding 52 and secondary windings 54F and 54S. The isolation transformer serves as an isolated drive circuit to allow the control terminals (more specifically gates) of switches 46F and 46T to float relative to the switches 46S and 46R. The isolation transformer, having primary 52 and secondary 54F and 54S, is a simple 1:1:1 pulse transformer. The drains of semiconductor switches 46F and 46T directly contact the inverter input line 42 and, therefore, may be considered as input terminals to those switches, whereas the source terminals of switches 46F and 46T may be considered as output terminals as they directly contact the respective inverter output lines 50 and 48. On the other hand, the sources of transistors 46S and 46R serve as input terminals in that they receive the input from inverter input line 44 by way of resistor 56, whereas the drains of switches 46S and 46R serve as output terminals in that they respectively connect to inverter output lines 50 and 48.

Each of the switches 46F, 46S, 46T, and 46R has a diode 58 connected in parallel with it. The diodes 58 prevent the transistor switches from burning out during the momentary deadband between turn off of one pair of switches and turn on of another pair of switches.

The inverter output lines 48 and 50 are connected to a primary 60 of a power transformer 26. The turns ratio between the primary 60 and high voltage secondary winding 64 is established to provide a 2,000 volt square wave across the secondary winding when loaded to draw an average current of 540 mA. This voltage is half wave doubled by diode 66 and charge holding capacitor 68. The resulting negative going 4,000 volt square wave is applied to the cathode of the cooking magnetron 70. Typically, the power transformer 26 may have a primary winding 60 with 24 turns and a high voltage secondary 64 having 440 turns. Additionally, a low voltage one turn secondary winding 72 provides the required 3 volts at 14 amps (RMS) for the filament of magnetron 70 and a 2 turn secondary winding 74 provides low voltage power to operate the control circuit 24.

Basic Inverter and Control Circuit Operation

Continuing to view FIG. 2, but also considering the waveform diagram of FIG. 3, the basic operation of the inverter 22 will be explained. The control circuit 24, which is discussed in detail below, may be used to provide different power levels to the magnetron 70. Parts (a)-(f) of FIG. 3 relate to a low power 20% operation, whereas parts (g)-(1) relate to a high power 100% operation of the magnetron.

Figure 3:
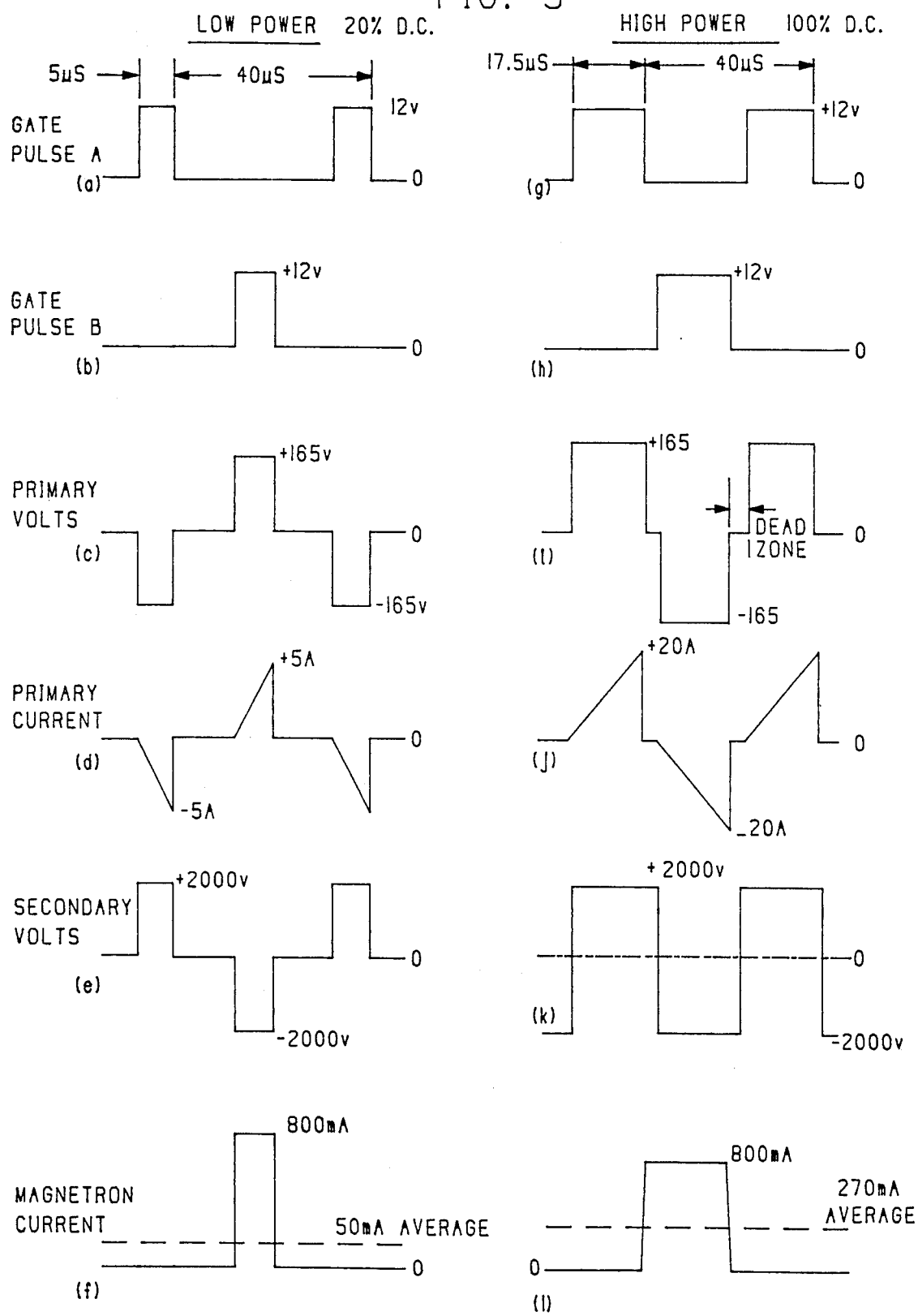
FIG. 3 is a time diagram of waveforms generated at different parts of the present system.

Taking first the low power operation, the control circuit 24 generates a gate pulse shown at part (a) of FIG. 3, which gate pulse appears at output A of control circuit 24 in FIG. 2. The gate pulse turns on or closes the transistor switch 46S and, by way of primary 52 and secondary 54S, closes the switch 46T. The control circuit 24 controls the power supplied to the magnetron 70 by controlling the width of the pulse. In part (a) of FIG. 3, the pulse is 5 microseconds wide. The frequency of the pulses is constant and the gate pulses A are generated repetitively during a series of first time intervals starting every 40 microseconds. Interspersed with the first time intervals, a series of gate pulses B (only one is shown in part (b) for ease of illustration) are generated at output B of control circuit 24. The gate pulse B closes the switches 46F and 46R. As shown in part (c) of FIG. 3, the alternate closing of pairs of the switches (46S and 46T together, and 46F and 46R together) applies the bulk D.C. (up to 165 volts peak) in alternate directions to the primary 60 of power transformer 26. The current in primary 60 is represented in part (d) of FIG. 3, whereas the voltage across secondary 64 is shown in part (e). The resulting magnetron current of approximately 800 mA is shown in part (f) of FIG. 3.

The operation of the circuitry as shown in parts (g)-(1) of FIG. 3 is essentially identical to that of parts (a)-(f) of FIG. 3 except that the gate pulses A and B are greater in width which in turn increases the width in all of the related waveform pulses. This corresponds to a greater time during which the current of 800 mA is applied to the magnetron as shown in part (1) of FIG. 3. Accordingly, an average of 270 mA is applied during high power operation, whereas the average is only 50 mA for low power operation.

It should be noted that, even in the high power operation of FIG. 3 parts (g)-(1), there should be a short dead zone between the end of one of the gate pulses at output A or output B and the beginning of the gate pulse at the alternate output. The existance of this "dead zone" is best illustrated in part (i) of FIG. 3, it being understood that this dead zone represents the delay from the end of gate pulse B to the beginning of gate pulse A. Typically, this delay might be 2.5 microseconds for a total dead zone of 5 microseconds considering also the corresponding delay between the end of gate pulse A and the beginning of gate pulse B.

Control Circuit Details

Line regulation and output power control are provided by control circuit 24 which senses magnetron current and uses this current information in a closed loop feedback system to control the pulse width of the control signals applied to inverter 22. Control circuit 24, shown in greater detail in FIG. 4, functions as a pulse width modulator circuit. For ease of illustration, FIG. 2 does not include some components which are shown in the more detailed view of FIG. 4.

Control circuit 24 comprises a suitable drive generator chip 24C, such as the SG3526J, a pulse width modulator integrated circuit by Silicon General. The pulse repetition rate, 25 KHz in the preferred embodiment, is established by using a timing capacitor 76 and a timing resistor 78 which respectively might have values such as 0.005 microfarads and 7.5 K ohms. A resistor 80, which establishes the dead zone, might have a value of, for example, 9 ohms. A slow start capacitor 82, which might have a typical value of 100 microfarads, is used to cause a linear time delay from start to reaching the operational pulse width.

Figure 4:
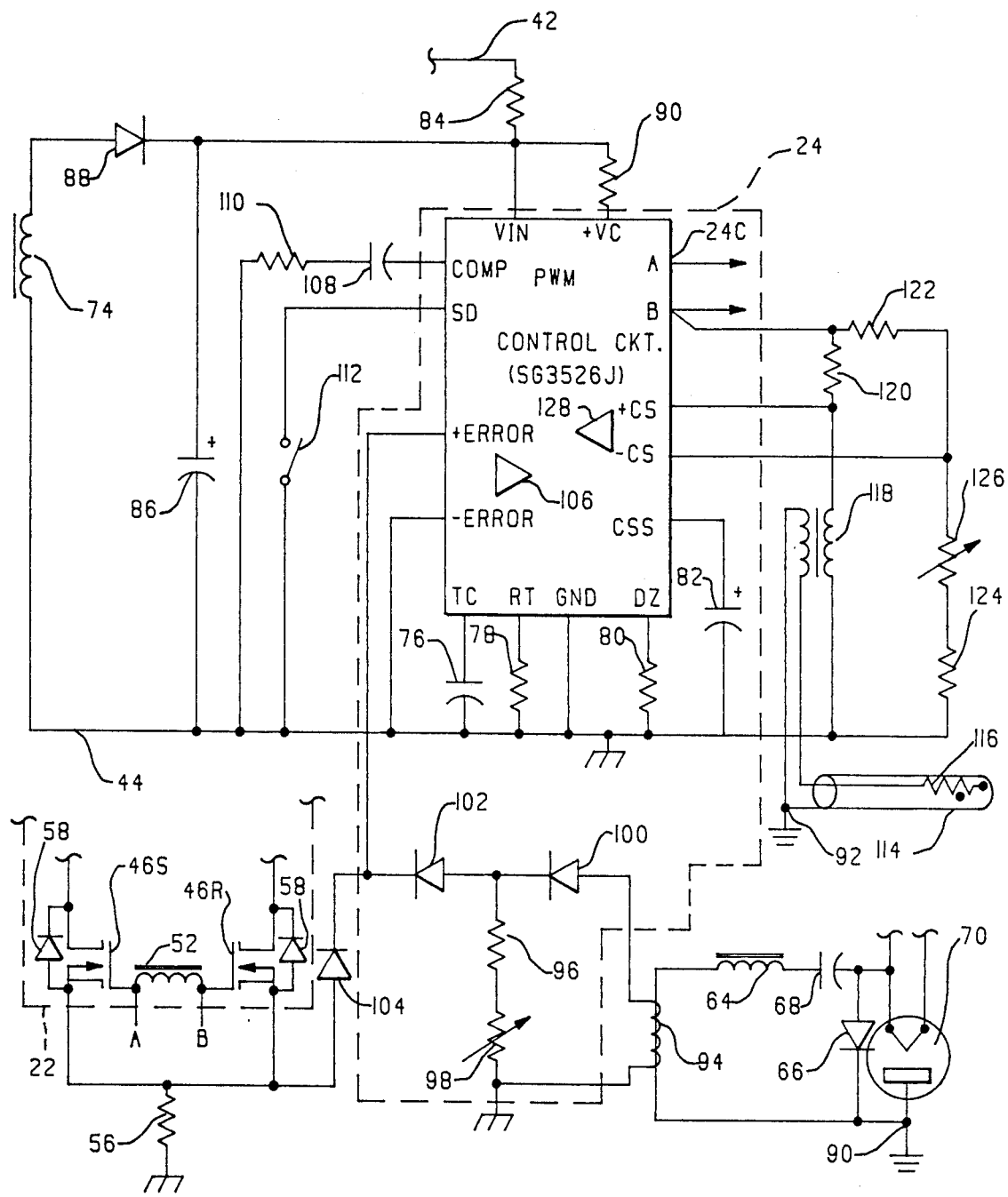
FIG. 4 shows details of a control circuit used with the present system.

When the control circuit 24 is in a stand-by condition (i.e., not generating gate pulses), the quiescent current is about 12 mA at a voltage of 15 volts. The quiescent current is supplied via a limiting resistor 84 connected to bulk DC rail 42 and smoothed to remove ripple from the AC line by smoothing capacitor 86. Improved regulation might be obtained by placing a 15 volt zener (not shown) in parallel with the capacitor 86. When generating gate pulses, the higher operating current for the control circuit is supplied by the low voltage winding 74 of the power transformer 26 (only winding 74 is shown in FIG. 4). This operating current is rectified by diode 88 and filtered by capacitor 86. A current limiting resistor 90, which might have a value of 33 ohms, is used to feed voltage to the common collectors of the control circuit chip 24C.

Line regulation and output power control is achieved by sensing magnetron current and using this signal to control the pulse width of control signals generated by control circuit 24. Proportional control of the pulse width is implemented using an error amplifier 106 internal to the control circuit chip 24C.

Toroid transformer 94 serves as a current transformer to sense the magnetron current. As shown in FIG. 4, the current sensing transformer 94 directly senses the current between secondary 64 and the magnetron. The secondary winding of this transformer has 20 turns and the primary of transformer 94 has 1 turn to provide a suitably transformed current. The transformed current generates a voltage across resistor 96 in series with variable power control resistor 98 which is rectified by diode 100 to provide a signal at the common node between resistor 96 and diode 100. This signal is proportional to the magnetron current for a given setting of the variable power control resistor 98. Power control variable resistor 98 is adjusted by the user to select the desired magnetron output power. This proportional voltage signal is applied via diode 102 to the plus input signal of a transconductance amplifier 106 within the control chip 24C. The signal ground line 44 floats relative to the line ground 92 because of the forward conduction characteristics of the diodes within bridge rectifier 18R (18R shown in FIG. 2 only). Accordingly, isolation is required between the line grounded node of magnetron 70 and the signal ground or inverter input line 44. Transformer 94 also provides the necessary isolation.

The internal architecture of the pulse width modulation control circuit chip 24C provides an output signal having a pulse width proportional to the input error as determined by the error amplifier 106. During normal operation, the pulse width is determined by the voltage across the resistors 96 and 98, this voltage in turn being determined by the magnetron current. An example may be useful to best explain the feedback operation, considering first input regulation. If the circuit constants are established to provide full magnetron power output of 700 watts from a low line voltage of 110 volts with the pulse width modulator chip 24C producing pulse widths corresponding to 75% duty cycle, an increase in line voltage will in turn cause the magnetron current to increase such that the input error to the error amplifier 106 will be increased. This increase in the input error in turn reduces the pulse width and restores the magnetron current to the set point. For power control, user adjustment of the power adjustor variable resistor 98, changes the voltage across resistors 96 and 98 and, consequently, the plus input to the amplifier 106. This changes the pulse width of the control signal to inverter 22 which in turn changes the power applied to the magnetron.

Amplifier 106 is also used to provide protection against excessive peak currents through switches 46F, 46R, 46S, and 46T. To this end, current sensing resistor 56 is used to sense the magnitude of the switching current. The voltage developed across resistor 56 is coupled to the + input of error amplifier 106 via diode 104. Diode 104 and 102 are configured in logical OR fashion, to permit use of amplifier 106 for both magnetron current control and to limit switching current in inverter circuit 22.

The transconductance or error amplifier 106 has its gain and phase control established by an external frequency compensation network comprising capacitor 108 and resistor 110. As an example, using a capacitor 108 of 100 pF and a resistor 110 of five kilo ohms, compensation is made for unity-gain stability by placing a pole at 400 Hz.

Start and stop operation of the pulse width modulator control circuit chip 24C is achieved by control of the relay contact 112 which connects and disconnects a shutdown ("SD") input with respect to the signal ground line 44.

Probe Isolation

As shown in FIG. 4, a temperature probe 114 may be used in conjunction with the control chip 24C. In particular, temperature probe 114 includes a temperature dependent resistive element 116, one side of which is connected to the line ground 92. Accordingly, electrical isolation is necessary between the temperature probe 114 and the floating signal ground 44 of the control circuit chip 24C. A toroid transformer 118 is used to provide the necessary isolation. A BNC or other connector (not shown) may be used to attach and detach the connection between probe 114 and transformer 118. Temperature probe 114 may be driven by the pulses output at B of chip 24C. This pulse is applied to the primary of transformer 118 by way of resistor 120. Additionally, this output pulse feeds a temperature setpoint resistor network having resistors 122 and 124 and variable resistor 126. The common node between resistor 120 and primary of transformer 118 is used as the positive input to a comparator amplifier 128 internal to chip 24C. This built-in comparator amplifier 128 inhibits the output control gate pulses at A and B upon its activation, thus shutting down inverter 22. As temperature increases, the resistance of element 116 decreases which causes more current to flow through the primary of isolation transformer 118. This change in current is sensed as a changing voltage across the sensing resistor 120. When equal to the setpoint determined by the voltage provided by resistors 122, 124, and 126, this temperature dependent voltage disables the comparator amplifier 128 and causes the inverter to go into a shutdown mode. Accordingly, when the temperature as sensed by element 116 reaches the preset temperature which is established by setting the variable resistor 126, the microwave power is turned off.

Flying Capacitor Isolation Drive

Figure 5A:
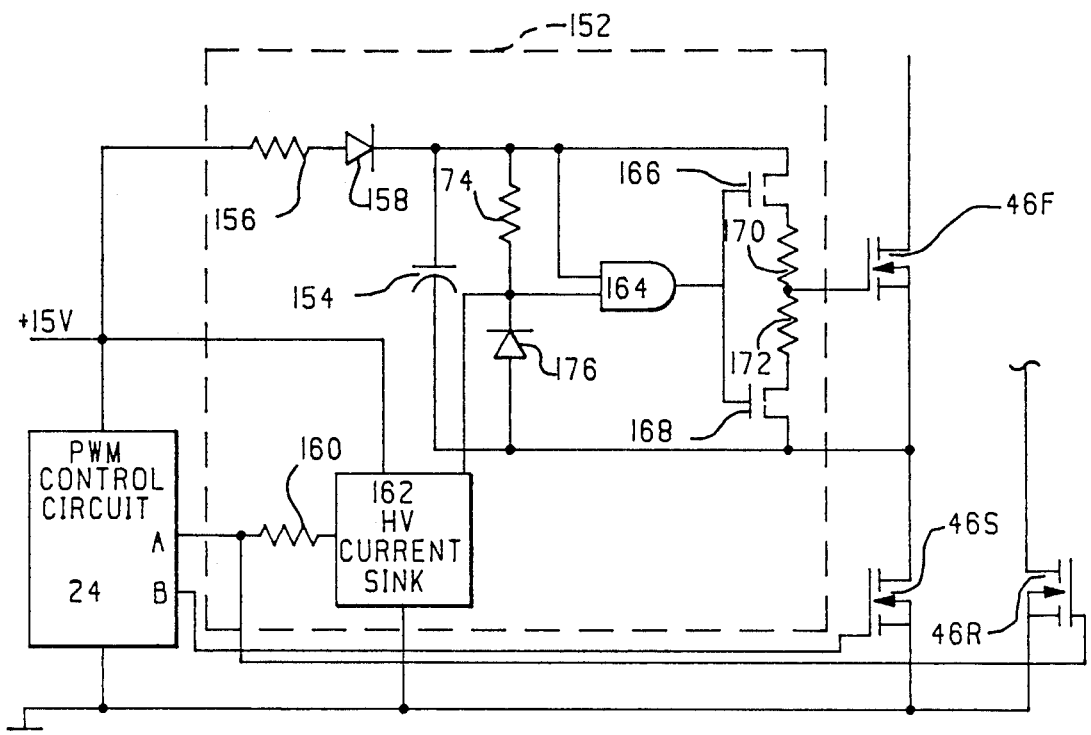
FIG. 5A shows an isolated drive circuit which could be used in place of an isolation transformer of FIG. 4.

With reference now to FIGS. 2 and 5A, an alternative to the isolation drive circuit of primary winding 52 and secondary windings 54F and 54S (FIG. 2) will be described. Instead of using an isolation transformer as the isolation drive circuit as in the FIG. 2 embodiment, FIG. 5A shows how a control circuit 24 may be connected to operate the upper transistor 46F by way of a flying capacitor isolation drive circuit 152. In practice, the isolation drive circuit would include 2 of the flying capacitor drive circuits 152, it being readily understood that a similar circuit 152 would be connected between the B output of control circuit 24 and the gate of the transistor 46T (FIG. 2).

The flying capacitor drive circuit 152 is based upon the fact that power FETs, like MOSFET 46F, are voltage driven and draw negligible gate current in the on state. Accordingly, the drive circuit 152 uses capacitor 154 to store the drive voltage. The capacitor 154 floats on the source potential of the source of FET switch 46F and the drain of switch 46S.

When transistor 46S is turned on (the B output generates a gate pulse), capacitor 154 charges to 15 volts through resistor 156 and diode 158. Following the turn-off or opening of switch 46S and a short dead zone (the control chip 24 operates in the same fashion as discussed above), the control chip generates a pulse at output A. This gate pulse turns on the switch 46R and also, by way of resistor 160, initiates current flow in the high voltage current sink 162. The current flow into the sink 162 activates the previously inactive gate 164. The output of gate 164 then rapidly turns on the switch 46F by way of complimentary switches 166 and 168 and associated resistors 170 and 172. Resistor 174 and diode 176 are connected to one input of the gate 164 to provide appropriate input signals.

Upon cessation of the pulse at output A of the pulse width modulator control circuit 24, the lower input of gate 164 is changed. The output of gate 164 in turn causes the gate-source drive voltage of transistor 46F to reduce to almost zero (transistor switch 168 is conducting), thereby turning switch 46F off.

Figure 5B:
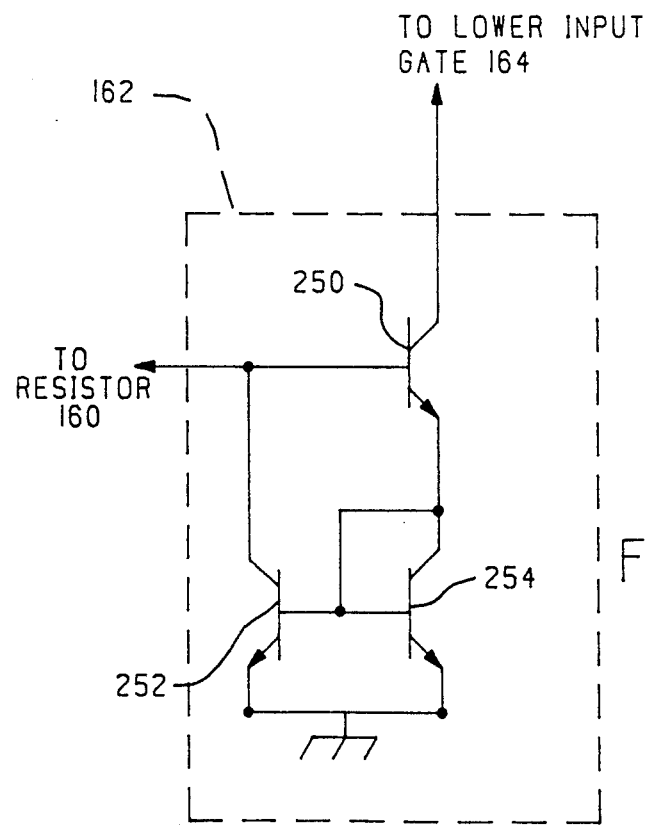
FIG. 5B shows a current sink circuit which could be used in the drive circuit of FIG. 5A.

One example of a suitable circuit for current sink 162 may be a simple current sink as shown in FIG. 5B wherein transistor 250 is used to turn on a current mirror formed by transistors 252 and 254 in which case no 15 volt connection is required. It will be appreciated that other current sink circuitry could be similarly employed.

Filament Power Compensation

In conventional LC power supply systems for oven magnetrons, the magnetron filament winding is wound on the same core as the high voltage winding. Accordingly, the filament winding is energized when the LC power supply transformer primary is energized and de-energized when the primary is de-energized. Thus, the filament can cool down during the OFF intervals of the duty cycle which with conventional 60 Hz power supply circuits can be on the order of 15-30 seconds duration. Approximately three seconds are required to raise the cathode to full operating temperature when starting with a cold cathode. During this period, the magnetron can oscillate at an incorrect mode or may jump in and out of odd modes, especially when one is starting from a cold cathode. When the magnetron jumps into and out of an odd mode, the oscillation often ceases, which usually causes very high voltage transients to develop (typically 12 to 14 kilovolts).

The present system avoids the potentially long OFF intervals typical of duty cycle control arrangements. Thus, the magnetron cathode remains at almost constant temperature which improves the magnetron tube life and eliminates the problem of periodically generated high voltage transients.

A commonly used prior art approach employs a separate filament transformer is placed in parallel with the power transformer providing constant filament voltage (except for variations in filament voltage caused by line variations). This approach could be employed with the inverter circuit of the present invention. However, in the illustrative embodiment, a low voltage secondary winding on the power transformer provides the filament voltage. In this system, the filament winding 72 (FIG. 2) may cause power changes in the filament of magnetron 70 as the pulse width is varied to adjust the magnetron power as herein before described with reference to FIG. 3.

Figure 6:
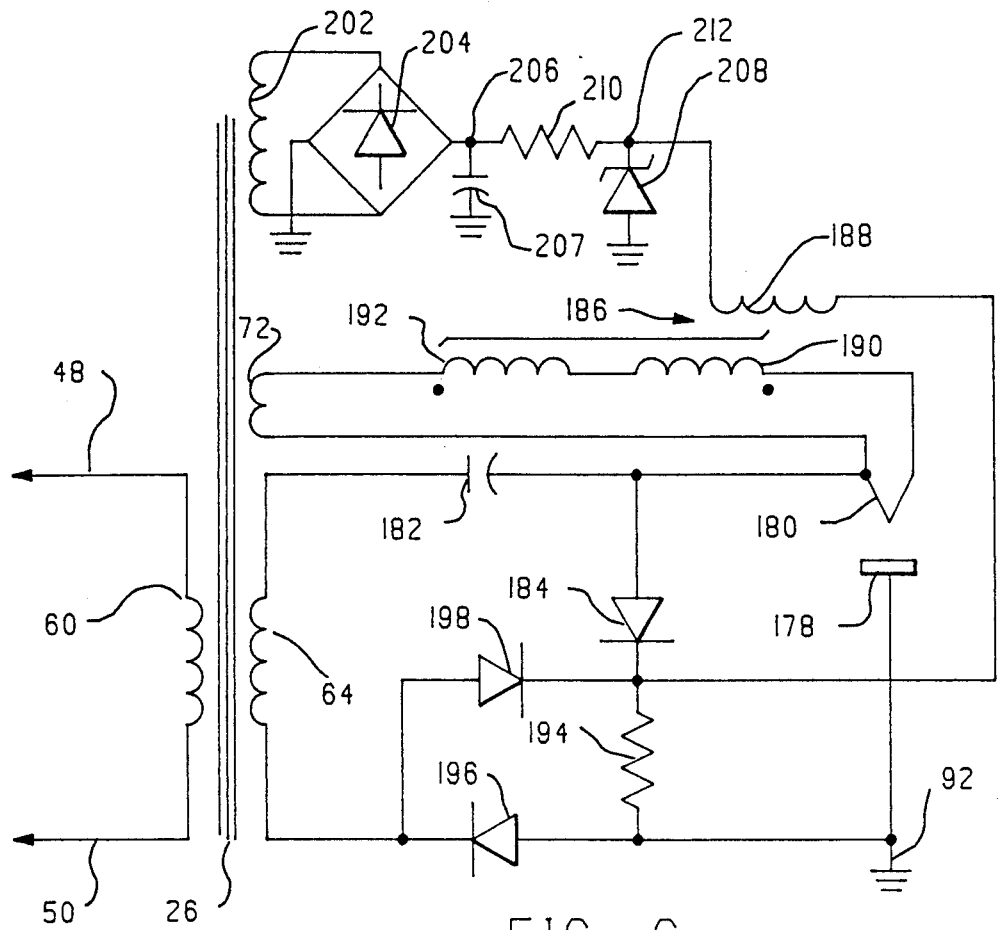
FIG. 6 shows an arrangement for regulating filament voltage.

FIG. 6 shows an illustrative embodiment of an arrangement for regulating the filament against changes which would otherwise occur as the pulse width is varied. The primary winding 60 of power transformer 26 is connected to inverter output lines 48 and 50 just as in FIG. 2. Magnetron filament regulation circuitry is added to the secondary side of the power transformer circuit to provide the desired filament regulation. It should be noted that the additional secondary winding 74 in FIG. 2 has been omitted from FIG. 6 in the interest of clarity.

In FIG. 6, it will readily appreciated that the capacitor 182 and diode 184 serve to halfwave double the voltage in essentially the same fashion as capacitor 68 and diode 66 of FIG. 2. A controlled variable impedance means in the form of a small saturable core reactor 186 comprising a control winding 188 and two controlled windings 190 and 192 is operatively connected in the filament power circuit between the low voltage filament secondary winding 72 of the main power transformer 26 and the magnetron filament to stabilize filament power. The impedance of the variable impedance means changes in response to a control signal generated by sensing means which senses a change in the power supplied to the primary winding of the power transformer.

The core of reactor 186 has two outer magnetic paths and a center path. The controlled windings 190 and 192 are oppositely wound on respective outer paths. The control winding 188 is wound on the inner path. A reactor having a controlled winding inductance which varies from approximately 150 microhenries with no current in the control winding to approximately 50 microhenries with a control winding current of approximately 60 milliamps, for a 3:1 control ratio, would be suitable for use in the circuit of the illustrative embodiment. (The filament is primarily a resistive load such that control of the current essentially controls voltage as well.)

Sensing means for sensing changes in power applied to the primary 60 transformer 26 in the illustrative embodiment is provided in the form of sensing resistor 194 serially connected between the cathode of diode 184 and magnetron anode ground 92. Diodes 196 and 198 are connected to provide a current path through resistor 194 for the charging current and discharging current respectively for capacitor 182. THe voltage at the junction of diode 184 and resistor 194 is proportional to the magnetron current which is a direct function of the power applied to the primary 60. Thus, a voltage which is representative of the power applied to primary 60 is developed at the junction of diode 184 and resistor 194. This voltage serves as the control voltage for reactor 186. One side designated the control terminal of control winding 188 of reactor 186 is connected to the junction of diode 184 and resistor 194. The other side or terminal is connected to a reference supply voltage circuit 200. Reference supply circuit 200 is energized by a low voltage secondary winding 202 of power transformer 26. A full wave rectifier circuit 204 connected across secondary winding 202 provides a pulsating DC voltage at 206 filtered by filter capacitor 207. This voltage is coupled to one side of a zener diode 208 by current limiting resistor 210. The other side of zener diode 208 is connected to the zener voltage thereby providing an essentially constant reference voltage which is applied to the other side of control winding 188.

By this arrangement, the voltage across the control winding 188 which determines the inductance of the controlled windings 190 and 192 is the difference between the control voltage at the junction of diode 184 and sensing resistor 194 and the reference voltage at 212. The value of resistor 194 and the zener voltage level are selected to limit the control voltage at 212 to a range of values not exceeding the reference voltage over the desired range of magnetron current. Since the voltage applied to the control terminal of winding 188 is always less than or equal to the reference voltage, and since it varies directly with magnetron current, the voltage across the control winding 188 and consequently the current through winding 188 varies inversely with magnetron current.

As described with reference to FIG. 3, the power applied to primary winding 60 is varied by varying the pulse width of pulses applied to the primary by the inverter circuit 22 (FIG. 2). As the pulse width increases, the magnetron current increases. As the magnetron current increases, the voltage at the junction of resistor 194 and diode 184 increases proportionally. This decreases the voltage differential across control winding 188, proportionally increasing the impedance of the controlled windings 190 and 192 in series with the magnetron filament, thereby reducing the filament current. Since the filament is essentially a resistive element, the reduction in current proportionally reduces the filament power. Similarly, a decrease in the power applied to the primary, such as by reducing the width of the pulses applied to the primary, reduces the magnetron current. The control voltage is reduced proportionally, increasing the voltage differential across control winding 188. This increase in control winding voltage lowers the impedance of controlled windings 190 and 192 thereby increasing the power applied to the filament. When so employed, the characteristics of the reactor 186 help to stabilize filament voltage against changes which would otherwise occur as the pulse width applied to primary 60 is varied.

Physical Layout of Circuit

Figure 7:
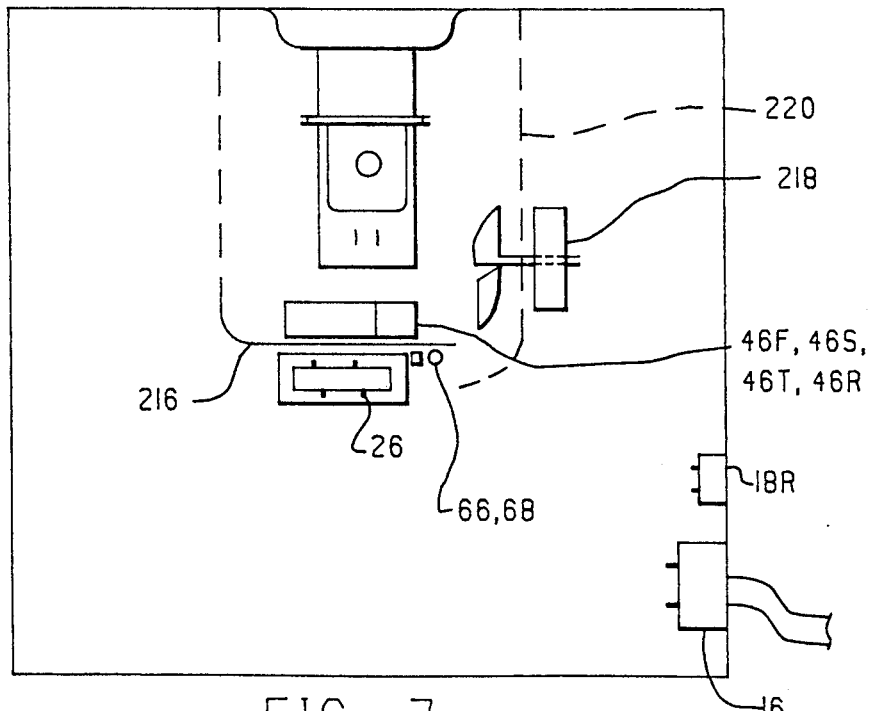
FIG. 7 shows a layout which might be used with the present invention.

FIG. 7 shows a typical assembly using the full wave bridge inverter inside a microwave oven. A printed circuit board 216 includes the electronic parts for switching including the four semiconductor switches 46F, 46S, 46T, and 46R. Heat sinks associated with the switching transistors, the pulse width modulator control chip, and associated control components, inverter input filter capacitor, gate isolation drive transformer, and power relay, not separately identified in FIG. 10, would also be mounted upon the circuit board 216.

In order to reduce the operating temperatures of the switching transistors to the lowest possible level, transistor heat sinks are staggered in position and forced air cooled by being placed in the draught of magnetron cooling blower 218. The plenum 220 of the microwave oven guides forced air cooling across all of the heat radiating surfaces simply shown in FIG. 10 as the blocks on top of circuit board 216. Part of the forced air is directed onto the power transformer 26. As shown, the power transformer 26 is closely positioned to the printed circuit board 216 in order to reduce stray inductance.

FIGS. 8, 9, and 10 show detailed views of a heat sink 219 which may be used in the arrangement of FIG. 7. This heat sink is used to provide proper operating conditions for the switching transistors. Because the maximum case temperature for particular switching transistors appears at the geometrical center of the chip, it is vital to sink this heat away. It is also necessary to include sufficient thermal mass to prevent thermal excursions while the transistors cycle on and off. A TO 220 package mounting case plate 220 thermally contacts a main thermal path 222 from which a series of cooling fins 224 extend.

Although various specific circuit values, constructions, and other details have been disclosed herein, it is to be appreciated that these are for illustrative purposes only. Various modifications and adaptations will be readily apparent to those of skill in the art. Accordingly, it is understood that the appended claims are intended to cover all such modifications and changes as fall within the true spirit and scope of the invention.

What is claimed is:

1. A microwave energy generating system comprising:

a magnetron operable to generate microwave energy for cooking;

a power transformer having a primary winding and a magnetron powering secondary winding connected to supply power to said magnetron;

a full wave bridge inverter circuit with first and second input lines and first and second output lines, said first output line connected to a first end of said primary winding, said second output line connected to a second end of said primary winding, said inverter circuit having first, second, third, and fourth switches, each of said switches having an input terminal, output terminal, and a control terminal, each control terminal operable to close and open its associated switch, said inverter circuit further having a control circuit for controlling all of said switches by their control terminals such that, during a series of first time intervals:

said first switch is closed to operatively connect said first input line to said second output line, said fourth switch is closed to operatively connect said second input line to said first output line, and said second and third switches are open, the closure of said first and fourth switches causing current flow in a first direction in said primary winding.

and such that during a series of second time intervals, alternating with said first time intervals:

said second switch is closed to operatively connect said second input line to said second output line, said third switch is closed to operatively connect said first input line to said first output line, and said first and fourth switches are open, the closure of said second and third switches causing current flow in a second direction, opposite to said first direction in said primary winding;

and wherein said first and second switches extend in series between said first input line and said second input line and said third and fourth switches extend in series between said first input line and said second input line, and wherein said control terminals of said first and third switches float with respect to said second and fourth switches, and further comprising an isolated drive circuit, and wherein said control circuit is operable to control said first and third switches by way of said isolated drive circuit applying signals to the control terminals of said first and third switches and wherein said isolated drive circuit includes a first capacitor which charges up when said second switch is closed and wherein the charge of said first capacitor closes said first switch responsive to said control circuit, and wherein said isolated drive circuit includes a second capacitor which charges up when said fourth switch is closed and wherein the charge of said second capacitor closes said third switch responsive to said control circuit.

2. The microwave energy generating system of claim 1 wherein said control circuit includes a pulse width modulator.

3. The microwave energy generating system of claim 2 wherein said control circuit receives a control input signal representative of current in said magnetron, and said control circuit is operable to switch pairs of said switches to an open state upon said control input signal reaching a predetermined level, and wherein each of said switches is a semiconductor switch.

* * * * *